United States Patent [19]
Ho et al.

[11] Patent Number: 5,943,645
[45] Date of Patent: Aug. 24, 1999

[54] METHOD AND APPARATUS FOR COMPUTING MEASURES OF ECHO

[75] Inventors: Dominic Ho, Saskatchewan; Rafi Rabipour; Majid Foodeei, both of Montreal, all of Canada

[73] Assignee: Northern Telecom Limited, Montreal, Canada

[21] Appl. No.: 08/847,527

[22] Filed: Apr. 24, 1997

Related U.S. Application Data

[60] Provisional application No. 60/034,267, Dec. 19, 1996.

[51] Int. Cl.⁶ ..................................................... H04M 9/08
[52] U.S. Cl. ........................... 704/226; 704/219; 704/216
[58] Field of Search .................................. 704/226, 227, 704/216, 218, 219, 225

[56] References Cited

U.S. PATENT DOCUMENTS

| | | | |
|---|---|---|---|
| 4,764,955 | 8/1988 | Galand et al. . | |
| 4,918,685 | 4/1990 | Tol et al. | 704/226 |
| 5,117,418 | 5/1992 | Chaffee et al. | 704/226 |
| 5,570,423 | 10/1996 | Walker et al. | 379/406 |
| 5,668,871 | 9/1997 | Urbanski | 704/226 |
| 5,696,821 | 12/1997 | Urbanski | 704/226 |
| 5,818,945 | 10/1998 | Makino et al. | 381/66 |

FOREIGN PATENT DOCUMENTS

| | | |
|---|---|---|
| 0 515 242 A1 | 4/1992 | European Pat. Off. . |
| WO 95/23477 | 8/1995 | WIPO . |
| WO 96/27951 | 9/1996 | WIPO . |

*Primary Examiner*—David R. Hudspeth
*Assistant Examiner*—Daniel Abebe
*Attorney, Agent, or Firm*—C. W. Junkin

[57] ABSTRACT

In methods and apparatus for computing measures of echo of a far end signal in a near end signal, the evolution over time of frequency spectra of the near end and far end signals are compared to compute a measure of the echo. A far end spectrum of the far end signal and a near end spectrum of the near end signal are determined for each of a plurality of successive time intervals. A respective measure of correlation is determined for each of a plurality of spectrum pairs, each spectrum pair comprising a respective near end spectrum and a respective far end spectrum, the far end spectrum corresponding to a time interval which lags a time interval corresponding to the near end spectrum by a respective time lag. The measures of correlation are compared to determine a maximum measure of correlation which can be used as a measure of echo. The echo measure computation technique is particularly suitable for use in echo suppressors for digital cellular telephony systems, but has other applications.

21 Claims, 5 Drawing Sheets

METHOD AND APPARATUS FOR COMPUTING MEASURES OF ECHO

This appln. claims the benefit of U.S. Provisional Appln. No. 60/034,267 filed Dec. 19, 1996.

FIELD OF THE INVENTION

This invention relates to methods and apparatus for computing measures of echo in telecommunications systems.

BACKGROUND OF THE INVENTION

Echo is a common problem in telecommunications systems. Echo can be very annoying to users, particularly in telecommunications systems having relatively long transmission delays, as for example satellite telecommunications systems and cellular radio telecommunications systems. Consequently, several methods for suppressing echo have been developed.

In one type of known echo suppression techniques, received signals are first processed to determine whether echo is present. If echo is detected, the received signal is processed to suppress the echo. If no echo is detected, no echo suppression is applied.

Conventional echo detection techniques rely on measurements of the signal energy of far end (transmitted) and near end (received) signals to determine whether echo is present. Unfortunately, these echo detection techniques are not accurate enough to provide good performance in some applications.

SUMMARY OF THE INVENTION

An object of this invention is to provide novel methods and apparatus for computing measures of echo in telecommunications systems.

One aspect of the invention provides a method for computing a measure of echo of a far end signal in a near end signal. The method comprises:

(1) determining a far end spectrum of the far end signal for each of a plurality of successive time intervals;

(2) determining a near end spectrum of the near end signal for each of a plurality of successive time intervals;

(3) for each of a plurality of spectrum pairs, each spectrum pair comprising a respective near end spectrum and a respective far end spectrum, the far end spectrum corresponding to a time interval which lags a time interval corresponding to the near end spectrum by a respective time lag, determining a respective measure of correlation of the near end spectrum to the far end spectrum; and (4) comparing the measures of correlation to determine a maximum measure of correlation.

The method according to the invention relies on a comparison of the evolution over time of the frequency spectra of the near end and far end signals to compute a measure of the echo.

The maximum measure of correlation may be compared to a predetermined value, and echo detection may be declared when the maximum measure of correlation exceeds the predetermined value. Alternatively, the maximum measure of correlation may be used as a non-binary measure of the echo.

The near and far end spectra may be near and far end spectral envelopes, i.e., smoothed spectra as generated, for example, by time averaging spectra generated by Discrete Fourier Transforms (DFTs).

Alternatively, the far end signal may be an LPC-encoded speech signal, and the step of determining a far end spectral envelope for each of a plurality of successive time intervals may comprise deriving the spectral envelope from LPC coefficients and excitation parameters of the LPC-encoded speech signal for each of the successive time intervals. Similarly, the near end signal may be an LPC-encoded speech signal, and the step of determining a near end spectral envelope for each of a plurality of successive time intervals may comprise deriving the spectral envelope from LPC coefficients and excitation parameters of the LPC-encoded speech signal for each of the successive time intervals. In this case, the echo measure computation technique may be used at points in the telecommunications system where there is no access to the speech signal itself, but only access to the LPC-encoded speech signal. Consequently, the echo measure computation technique may be applied at locations other than the speech encoder or the speech decoder without requiring extra decoding and encoding operations. Thus, the technique can be particularly advantageous in codec bypass configurations of cellular radio telecommunications systems where there is access only to the encoded signal in the network portion of the telecommunications system.

Moreover, this variant of the invention can be implemented with little complexity because the LPC coefficients, which are already available, contain the required frequency domain information regarding the near end and far end signals.

The method may further comprise estimating an echo delay upon detection of echo by determining the time lag corresponding to the maximum measure of correlation.

The method may also comprise estimating an echo return loss upon detection of echo by determining a ratio of a near end signal energy value to a far end signal energy value, the near end signal energy value being associated with a first time interval and the far end signal energy value being associated with a second time interval, the second time interval lagging the first time interval by an echo delay associated with the first time interval.

The estimated echo delay and echo return loss can be used to determine what signal processing should be used to suppress the echo most effectively.

Another aspect of the invention provides apparatus for computing a measure of echo of a far end signal in a near end signal. The apparatus comprises a processor and a memory, the memory storing instructions for execution by the processor. The instructions comprise:

(1) instructions for determining a far end spectrum of the far end signal for each of a plurality of successive time intervals;

(2) instructions for determining a near end spectrum of the near end signal for each of a plurality of successive time intervals;

(3) instructions for determining a respective measure of correlation of the near end spectrum to the far end spectrum for each of a plurality of spectrum pairs, each spectrum pair comprising a respective near end spectrum and a respective far end spectrum, the far end spectrum corresponding to a time interval which lags a time interval corresponding to the near end spectrum by a respective time lag; and (4) instructions for comparing the measures of correlation to determine a maximum measure of correlation.

Yet another aspect of the invention provides a processor-readable storage medium for storing instructions executable by a processor. The storage medium stores an instruction set comprising:

(1) instructions for determining a far end spectrum of a far end signal for each of a plurality of successive time intervals;

(2) instructions for determining a near end spectrum of a near end signal for each of a plurality of successive time intervals;

(3) instructions for determining a respective measure of correlation of the near end spectrum to the far end spectrum for each of a plurality of spectrum pairs, each spectrum pair comprising a respective near end spectrum and a respective far end spectrum, the far end spectrum corresponding to a time interval which lags a time interval corresponding to the near end spectrum by a respective time lag; and (4) instructions for comparing the measures of correlation to determine a maximum measure of correlation.

BRIEF DESCRIPTION OF THE DRAWINGS

Embodiments of the invention are described below by way of example only with reference to accompanying drawings, in which.

DETAILED DESCRIPTION OF EMBODIMENTS

Figure 1:
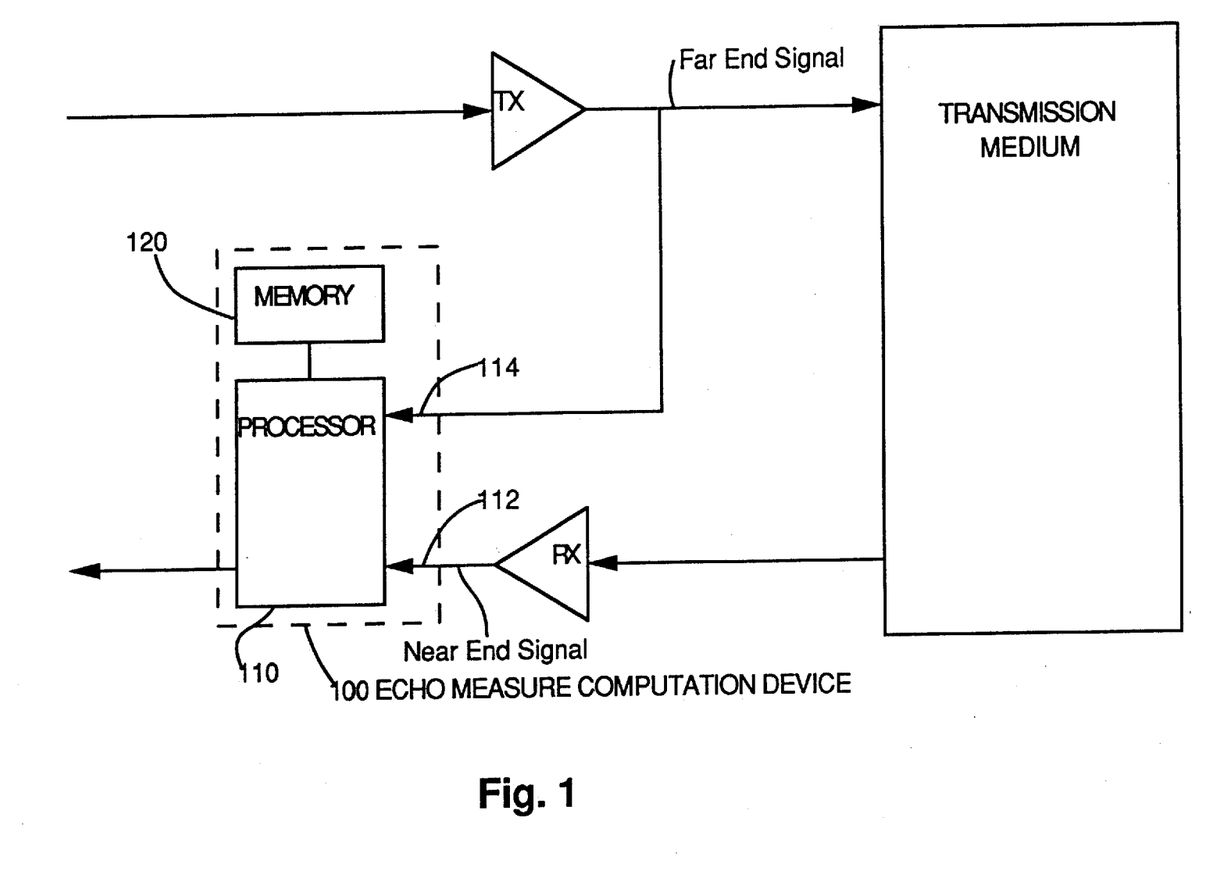
FIG. 1 is a block schematic diagram of a telecommunications system including an echo measure computation device according to an embodiment of the invention.

FIG. 1 is a block schematic diagram of a telecommunications system including an echo measure computation device 100 according to an embodiment of the invention.

The computation device 100 comprises a processor 110 and a processor-readable storage medium in the form of a memory 120 which stores instructions for execution by the processor 110. The processor 110 has a near end signal input port 112 on which it receives an LPC-encoded near end signal, and a far end signal input port 114 on which it receives an LPC-encoded far end signal. The processor 110 executes instructions stored in the memory 120 to process the near end and far end signals so as to compute measures of echo of the far end signal in the near end signal as described below.

Figure 2A:
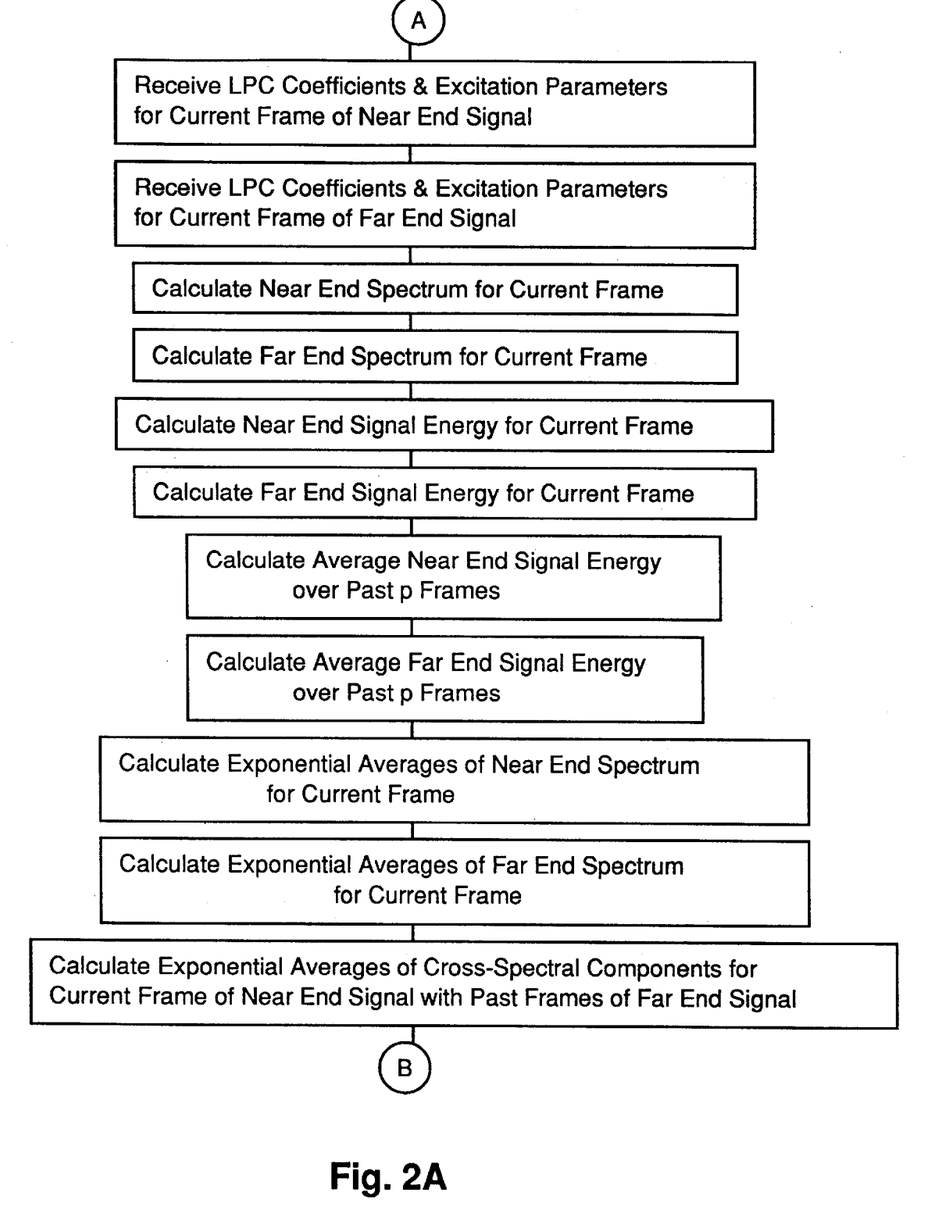
FIGS. 2A, 2B and 2C are flow charts showing steps in a method for echo measure computation according to an embodiment of the invention.
Figure 2B:
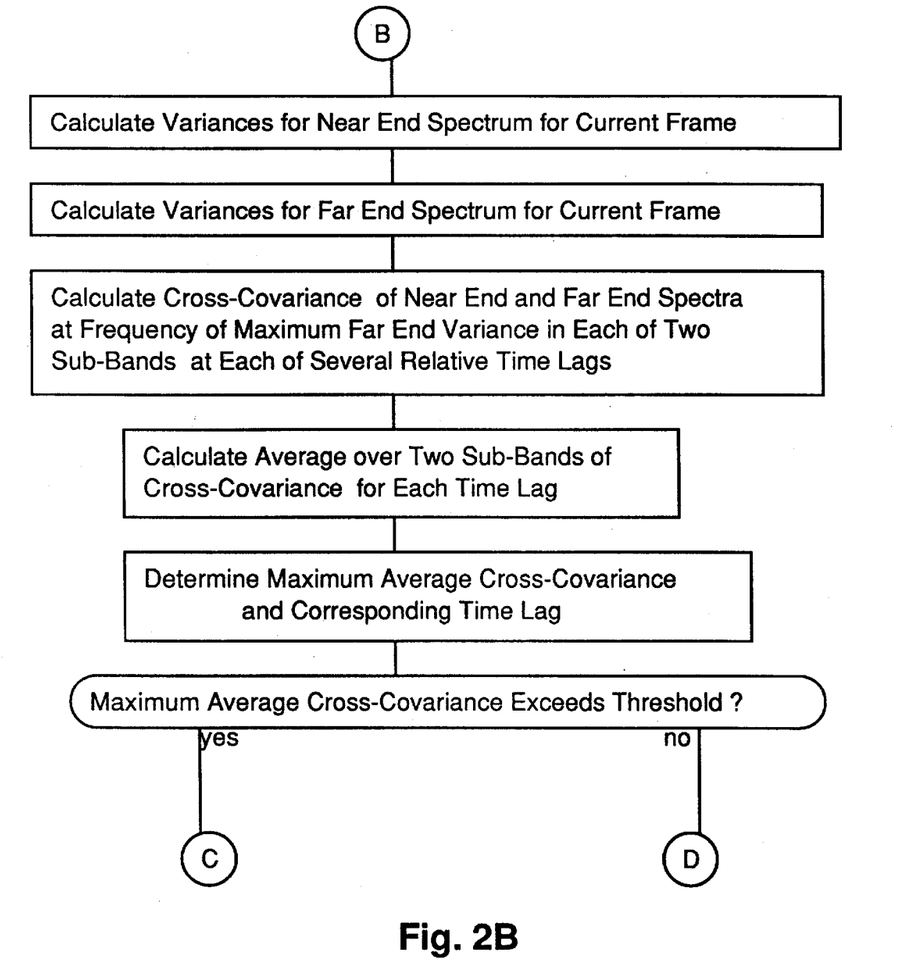
Figure 2C:
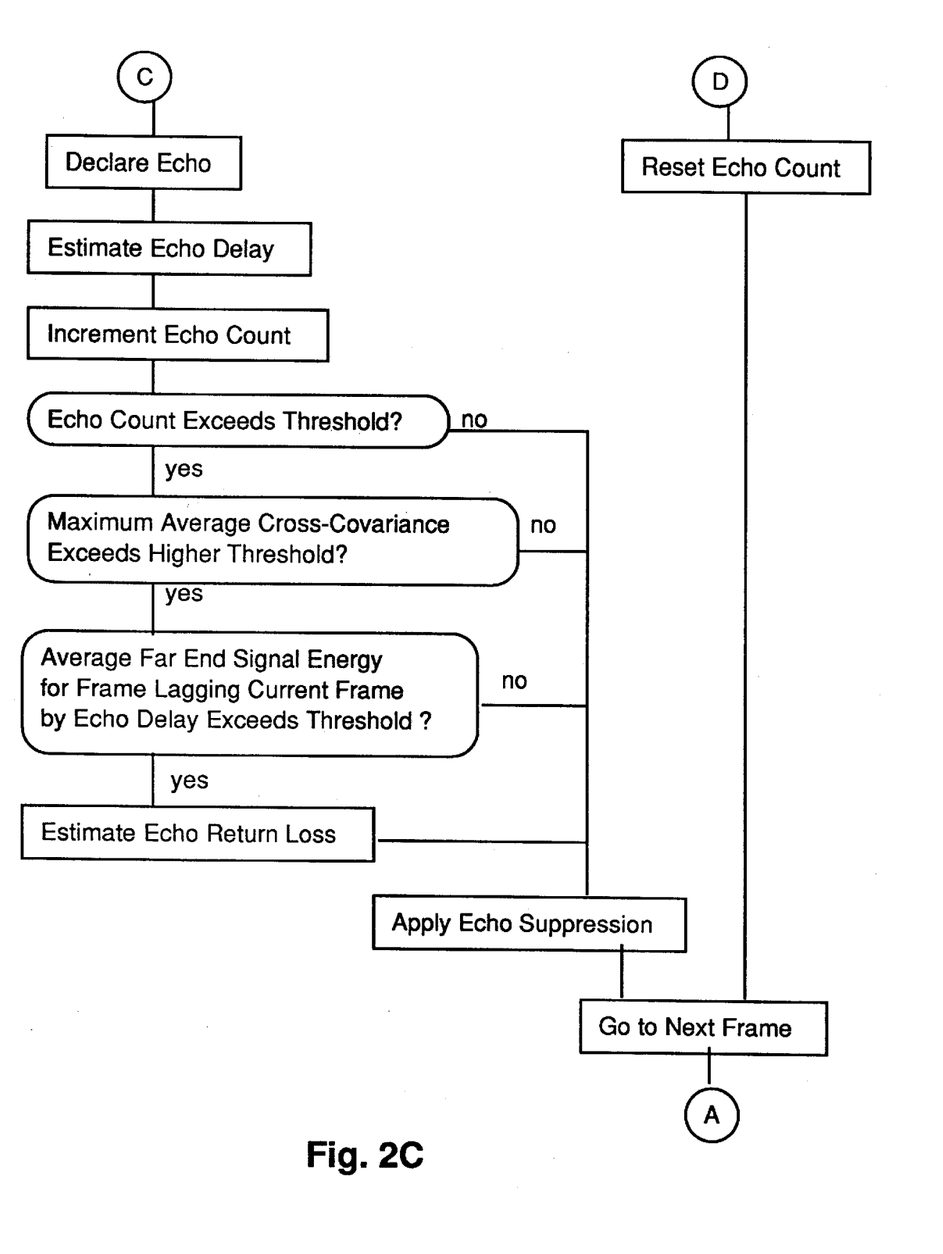

FIGS. 2A, 2B and 2C are flow charts showing steps performed by the processor 110 according to the instructions stored in the memory 120 to compute measures of echo of the far end signal in the near end signal.

For each successive 20 ms time interval, the processor 110 receives a frame of LPC-encoded information for the near end signal, and a frame of LPC-encoded information for the far end signal. The processor 110 executes stored instructions to derive a set of LPC coefficients and a set of excitation parameters from each frame of encoded information.

The processor 110 executes further stored instructions to calculate a near end spectrum, $S_N(f_i,k)$ for M values of $f_i$ between about 100 Hz and 2 kHz, for the frame corresponding to time k from the LPC coefficients and the excitation parameters for the frame of the near end signal corresponding to time k. Similarly, the processor 110 executes stored instructions to calculate a far end spectrum, $S_F(f_i,k)$ for M values of $f_i$ between about 100 Hz and 2 kHz, for the frame corresponding to time k from the LPC coefficients and the excitation parameters for the frame of the far end signal corresponding to time k. M is typically 8 to 12. The far end spectra for the past L 20 ms time intervals are stored in the memory for use in calculations described below. L is selected according to an expected value of echo delay. For example, if the expected echo delay is from 240 ms to 360 ms, L would be at least 18. (The methods used to derive spectra from LPC coefficients and excitation parameters depend on the specific LPC coding scheme used, and are well known to those skilled in the LPC coding art.)

The processor 110 also executes stored instructions to calculate a near end signal energy $R_N(k)$ from the LPC coefficients and the excitation parameters for the frame of the near end signal corresponding to time k, and a far end signal energy $R_F(k)$ from the LPC coefficients and the excitation parameters for the frame of the far end signal corresponding to time k. The near end signal energies are averaged over a predetermined number of frames, typically 2 or 3 frames. The far end signal energy values are also averaged over the predetermined number of frames, and the far end signal energy averages for the past L 20 ms time intervals are stored in the memory 120 for use in calculations described below. (The methods used to derive signal energies from LPC coefficients and excitation parameters depend on the specific LPC coding scheme used, and are well known to those skilled in the LPC coding art.)

The processor 110 executes stored instructions to calculate exponential averages of the near end and far end spectra according to the following equations:

$\overline{S_F}(f_i,k)=\lambda_1 \cdot \overline{S_F}(f_i,k-1)+(1-\lambda_1) \cdot S_F(f_i,k)$ for i=1 to M    Eq 1

$\overline{S_N}(f_i,k)=\lambda_1 \cdot \overline{S_N}(f_i,k-1)+(1-\lambda_1) \cdot S_N(f_i,k)$ for i=1 to M    Eq 2

$\overline{S_F^2}(f_i,k)=\lambda_2 \cdot \overline{S_F^2}(f_i,k-1)+(1-\lambda_1) \cdot S_F^2(f_i,k)$ for i=1 to M    Eq 3

$\overline{S_N^2}(f_i,k)=\lambda_1 \cdot \overline{S_N^2}(f_i,k-1)+(1-\lambda_1) \cdot S_N^2(f_i,k)$ for i=1 to M    Eq 4

$\lambda_1$ is typically 0.5.

An exponential average of cross-spectral components is also calculated according to the following equation:

$\overline{S_{FN}^2}(f_i,k)=\lambda_1 \cdot \overline{S_{FN}^2}(f_i,k-1)_l+(1-\lambda_1) \cdot S_F(f_i,k-l) \cdot S_N(f_i,k)$ for i=1 to M
and l=$L_0$, $L_0$+1, . . . , L.    Eq 5 where l denotes a time lag, $L_0$ is a minimum expected echo path delay, and L is a maximum expected echo path delay, each of these quantities representing an integer number of 20 ms time intervals.

The processor 110 executes further stored instructions to calculate variances of the near end spectra and the far end spectra according to the following equations:

$\text{var}(S_N(f_i,k))=\overline{S_N^2}(f_i,k)-\overline{S_N}^2(f_i,k)$ for =1 to M    Eq 6

$\text{var}(S_F(f_i,k))=\overline{S_F^2}(f_i,k)-\overline{S_F}^2(f_i,k)$ for =1 to M (store from k-L to Eq 7

The far end signal variances for the past L 20 ms time intervals are stored in the memory 120 for use in calculations described below.

The far end signal variances are divided into two groups. Group A contains the variances calculated for a sub-band of frequencies between 200 Hz and 920 Hz, a frequency range which generally contains a first formant frequency in a speech signal. The variances in Group A are compared, the maximum variance is determined and the frequency corresponding to the maximum variance is designated $f_A$. Group B contains the variances calculated for a sub-band of frequencies between 1160 Hz and 1800 Hz, a frequency range which generally contains a second formant frequency in a speech signal. The variances in Group B are compared, the maximum variance is determined and the frequency corresponding to the maximum variance is designated $f_B$.

The processor 110 executes further stored instructions to calculate a covariance at each of frequencies $f_A$ and $f_B$ for each time lag in the range between the minimum echo delay $L_0$ and the maximum echo delay L according to the following equation:

$$\rho_i^2(l, k) = \frac{(\overline{S_{FN}^2}(f_i, k)_l - \overline{S}_F(f_i, k-l) \cdot \overline{S}_N(f_i, k))^2}{\text{var}(S_F(f_i, k-l)) \cdot \text{var}(S_N(f_i, k))} \quad i = A, B \quad \text{Eq 8}$$

The processor 110 executes further stored instructions to average the covariances at the two frequencies to derive an average covariance for each time lag between $L_0$ and L as follows:

$$\rho^2(l, k) = \frac{1}{2} \sum_{i=A,B} \rho_i^2(l, k) \quad l = L_0, L_0 + 1, \ldots, L \quad \text{Eq 9}$$

The processor 110 then executes stored instructions to determine the maximum value of the average covariance:

$$\rho_{max}^2(k) = {}_l^{max}(\rho^2(l,k)) = \rho^2(l^0, k) \quad \text{eq 10}$$

and the time lag $l^0$ corresponding to the maximum value of the average covariance. The maximum value of the average covariance is a measure of echo of the far end signal in the near end signal which may be used as described below.

The processor 110 executes further instructions to compare the maximum value of the average covariance to a predetermined value (typically about 0.1). If the maximum value of the average covariance exceeds the predetermined value, the processor 110 declares frame k of the near end signal to contain echo.

When frame k of the near end signal is declared to contain echo, the processor 110 executes further stored instructions to calculate an exponential average of the time lag $l^0$ corresponding to the maximum value of the average covariance according to the following equation:

$$D(k) = \lambda_2 \cdot D(k-1) + (1 - \lambda_2) \cdot l^0(k) \quad \text{Eq 11}$$

to estimate an echo delay $D(k) \cdot \lambda_2$ is typically about 0.9 to 0.95.

When frame k is declared to contain echo, the processor 110 also executes further stored instructions to count consecutive echo frames. If the maximum value of the average covariance exceeds a predetermined value (which may exceed the predetermined value used for declaring echo in the first instance to provide even greater certainty that echo is present), the number of consecutive echo frames exceeds a predefined minimum number (typically 2 or 3) and the average far end signal energy at the time interval lagging the present time interval by the echo delay exceeds a predetermined threshold, an echo return loss (ERL) is estimated from the average signal energies calculated above according to the following equation:

$$ERL(k) = \lambda_2 \cdot ERL(k-1) + (1 - \lambda_2) \cdot \frac{\overline{R}_N(k)}{\overline{R}_F(k - l^0)} \quad \text{Eq 12}$$

where $\overline{R}_N(k)$ and $\overline{R}_F(k-l^0)$ are the averages of the near and far end energies respectively.

Figure 3:
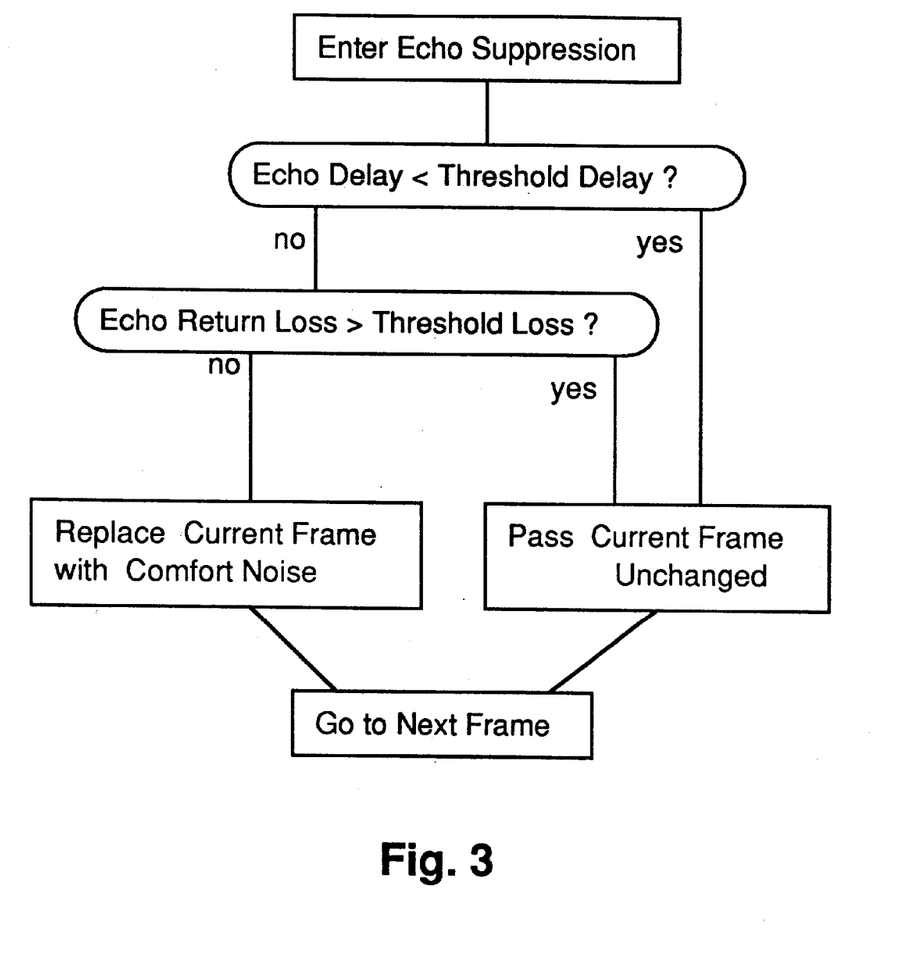
FIG. 3 is a flow chart showing steps in a method for applying echo suppression.

The echo delay, D(k), and the echo return loss, ERL(k), are used in further operations of the processor 110 to determine the most effective echo suppression treatment as shown in FIG. 3. If the echo delay, D(k), is less than a threshold delay, typically 10 msec, no echo suppression is applied. If the echo return loss, ERL(k), is greater than a threshold loss, typically 45–50 dB for an echo delay greater than 50 msec, no echo suppression is applied. But if the echo delay, D(k), exceeds the delay threshold, and the echo return loss, ERL(k), is below the loss threshold, the processor 110 executes stored instructions to replace the signal for frame k with comfort noise. In a sophisticated implementation, the loss threshold may be a function of the echo delay, D(k), for the current frame.

If the maximum value of the average covariance does not exceed the predetermined value, the processor 110 declares frame k of the near end signal to be echo-free, and takes no action to suppress echo in that frame of the near end signal, to calculate echo delay or to calculate echo return loss.

The implementations described above can be modified without departing from the principles of the invention. For example, the specific parameter values exemplified above, and the particular methods used for averaging over time, calculating near end and far end spectra, calculating measures of correlation for the near and far end spectra can be substituted with other parameter values and methods. Indeed, at least some such modifications are likely to be appropriate if the invention is applied to a different LPC coding scheme. The parameters given above are likely to be most appropriate for the VSELP codec specified by the IS-54 standard.

In the embodiment described above, the computed measure of echo is used to drive echo suppression. However, the computed measure of echo may also be used in a variety of other applications in which measures of echo are useful including, but not limited to, sparse echo cancellation.

In the embodiment described above, the maximum value of the average covariance is compared to a predetermined value to determine whether detectable echo is present. The maximum value of the average covariance could be compared to a plurality of predetermined values to estimate the relative level of echo. The relative level of echo could then be used to determine what further signal processing steps are appropriate, different signal processing being performed for different levels of echo. Indeed, the maximum value of the average covariance could itself be used as a measure of the level of echo.

In the embodiment described above, the maximum values of the covariance are selected from within two frequency sub-bands containing the first and second formant frequencies and averaged. This approach adds to the robustness of the technique at a reasonable level of computational complexity by emphasizing characteristics measured at frequencies where signal to noise ratios are expected to be maximized. More frequency sub-bands could be used to capture the characteristics at other formant frequencies.

These and other modifications are within the scope of the invention as defined by some or all of the claims below.

We claim:

1. A method for computing a measure of echo of a far end LPC-encoded signal in a near end LPC-encoded signal, comprising:

deriving a far end spectral envelope from LPC coefficients and excitation parameters of the LPC-encoded far end signal for each of a plurality of successive time intervals;

deriving a near end spectral envelope from LPC coefficients and excitation parameters of the LPC-encoded near end signal for each of a plurality of successive time intervals;

for each of a plurality of spectral envelope pairs, each spectral envelope pair comprising a respective near end spectral envelope and a respective far end spectral envelope corresponding to a time interval which lags a time interval corresponding to the near end spectral envelope by a respective time lag, determining a respective measure of correlation of the near end spectral envelope to the far end spectral envelope; and comparing the measures of correlation to determine a maximum measure of correlation.

2. A method as defined in claim 1, further comprising declaring an echo to be detected when the maximum measure of correlation exceeds a predefined value.

3. A method as defined in claim 1, wherein each step of determining a respective measure of correlation of a near end spectral envelope to a far end spectral envelope comprises a determining a cross-covariance of the near end spectral envelope to the far end spectral envelope for each of a plurality of frequency sub-bands.

4. A method as defined in claim 3, wherein each step of determining a respective measure of correlation of a near end spectral envelope to a far end spectral envelove comprises averaging the cross-covariances.

5. A method as defined in claim 3, wherein each step of determining a cross-covariance of a near end spectral envelope to a far end spectral envelope comprises calculating averages over time of the near end spectral envelope and the far end spectral envelope.

6. A method as defined in claim 2, further comprising, upon detecting echo, estimating an echo delay by determining the time lag corresponding to the maximum measure of correlation.

7. A method as defined in claim 6, wherein the step of estimating the echo delay further comprises determining an average over time of the echo delay.

8. A method as defined in claim 2, further comprising, upon detecting echo, estimating an echo return loss by determining a ratio of a near end signal energy value to a far end signal energy value, the near end signal energy value being associated with a first time interval and the far end signal energy value being associated with a second time interval, the second time interval lagging the first time interval by an echo delay associated with the first time interval.

9. A method as defined in claim 8, wherein:

the near end signal energy value is determined by averaging a near end signal energy over a plurality of time intervals preceding the first time interval; and the far end signal energy value is determined by averaging a far end signal energy over a plurality of time intervals preceding the second time interval.

10. A method as defined in claim 8, wherein the step of determining a ratio of a near end signal energy value to a far end signal energy value is performed only for time intervals for which the far end signal energy value exceeds a predetermined value.

11. A method as defined in claim 8, wherein the step of determining a ratio of a near end signal energy value to a far end signal energy value is performed only after a predetermined number of consecutive time intervals declared to contain echo.

12. Apparatus for computing a measure of echo of a far end signal in a near end signal, the apparatus comprising a processor and a memory, the memory storing instructions for execution by the processor, the instructions comprising:

instructions for deriving a far end spectral envelope from LPC coefficients and excitation parameters of the LPC-encoded far end signal for each of a plurality of successive time intervals;

instructions for deriving a near end spectral envelope from LPC coefficients and excitation parameters of the LPC-encoded near end signal for each of a plurality of successive time intervals;

instructions for determining a respective measure of correlation of the near end spectral envelope to the far end spectral envelope for each of a plurality of spectral envelope pairs, each spectral envelope pair comprising a respective near end spectral envelope and a respective far end spectral envelope corresponding to a time interval which lags a time interval corresponding to the near end spectral envelope by a respective time lag; and instructions for comparing the measures of correlation to determine a maximum measure of correlation.

13. Apparatus as defined in claim 12, wherein the instructions further comprise instructions for declaring an echo to be detected when the maximum measure of correlation exceeds a predefined value.

14. Apparatus as defined in claim 12, wherein the instructions further comprise instructions for estimating an echo delay upon detection of echo by determining the time lag corresponding to the maximum measure of correlation.

15. Apparatus as defined in claim 12, wherein the instructions further comprise instructions for estimating an echo return loss upon detection of echo by determining a ratio of a near end signal energy value to a far end signal energy value, the near end signal energy value being associated with a first time interval and the far end signal energy value being associated with a second time interval, the second time interval lagging the first time interval by an echo delay associated with the first time interval.

16. A processor-readable storage medium for storing instructions executable by a processor, the storage medium storing an instruction set comprising:

instructions for deriving a far end spectral envelope from LPC coefficients and excitation parameters of the LPC-encoded far end signal for each of a plurality of successive time intervals;

instructions for deriving a near end spectral envelope from LPC coefficients and excitation parameters of the LPC-encoded near end signal for each of a plurality of successive time intervals;

instructions for determining a respective measure of correlation of the near end spectral envelope to the far end spectral envelope for each of a plurality of spectral envelope pairs, each spectral envelope pair comprising a respective near end spectral envelope and a respective far end spectral envelope corresponding to a time interval which lags a time interval corresponding to the near end spectral envelope by a respective time lag,; and instructions for comparing the measures of correlation to determine a maximum measure of correlation.

17. A storage medium as defined in claim 16, wherein the instructions further comprise instructions for comparing the maximum measure of correlation to a predetermined value, and instructions for estimating an echo delay by determining a time lag corresponding to the maximum measure of correlation when the maximum measure of correlation exceeds the predetermined value.

18. A storage medium as defined in claim 16, wherein the instructions further comprise instructions for comparing the maximum measure of correlation to a predetermined value, and instructions for estimating an echo return loss by determining a ratio of a near end signal energy value to a far end signal energy value when the maximum measure of correlation exceeds the predetermined value, the near end signal energy value being associated with a first time interval and the far end signal energy value being associated with a second time interval, the second time interval lagging the first time interval by an echo delay associated with the first time interval.

19. A method for computing a measure of echo of a far end signal in a near end signal, comprising:

deriving a far end spectral envelope of the far end signal for each of a plurality of successive time intervals;

deriving a near end spectral envelope of the near end signal for each of a plurality of successive time intervals;

for each of a plurality of time lags, determining a respective measure of correlation of evolution over time of a far end spectral envelope and evolution over time of a near end spectral envelope, the evolution over time of the near end spectral envelope being delayed by a respective time lag with respect to the evolution over time of the far end spectral envelope; and comparing the measures of correlation to determine a maximum measure of correlation.

20. Apparatus for computing a measure of echo of a far end signal in a near end signal comprising a processor and a memory, the memory storing instructions for execution by the processor, the instructions comprising:

instructions for deriving a far end spectral envelope of the far end signal for each of a plurality of successive time intervals;

instructions for deriving a near end spectral envelope of the near end signal for each of a plurality of successive time intervals;

instructions for determining a respective measure of correlation of evolution over time of a far end spectral envelope and evolution over time of a near end spectral envelope for each of a plurality of time lags, the evolution over time of the near end spectral envelope being delayed by a respective time lag with respect to the evolution over time of the far end spectral envelope; and comparing the measures of correlation to determine a maximum measure of correlation.

21. A processor-readable storage medium for storing instructions executable by a processor, the storage medium storing an instruction set comprising:

instructions for deriving a far end spectral envelope of the far end signal for each of a plurality of successive time intervals;

instructions for deriving a near end spectral envelope of the near end signal for each of a plurality of successive time intervals;

instructions for determining a respective measure of correlation of evolution over time of a far end spectral envelope and evolution over time of a near end spectral envelope for each of a plurality of time lags, the evolution over time of the near end spectral envelope being delayed by a respective time lag with respect to the evolution over time of the far end spectral envelope; and comparing the measures of correlation to determine a maximum measure of correlation.

* * * * *